US012615539B2

(12) United States Patent
Taga et al.

(10) Patent No.: US 12,615,539 B2
(45) Date of Patent: Apr. 28, 2026

(54) NETWORK MANAGER AND METHOD

(71) Applicant: ROHDE & SCHWARZ GMBH & CO KG, Munich (DE)

(72) Inventors: Aziz Taga, Munich (DE); Lars Oestreicher, Munich (DE); Johannes Sinnhuber, Kaufering (DE); Maurice Uhlmann, St. Wolfgang (DE); Thomas Janner, Grobenzell (DE); Manfred Reitmeier, Landshut (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 369 days.

(21) Appl. No.: 18/559,008

(22) PCT Filed: May 4, 2022

(86) PCT No.: PCT/EP2022/062009
§ 371 (c)(1),
(2) Date: Nov. 3, 2023

(87) PCT Pub. No.: WO2022/233950
PCT Pub. Date: Nov. 10, 2022

(65) Prior Publication Data
US 2024/0244473 A1     Jul. 18, 2024

(30) Foreign Application Priority Data

May 4, 2021     (EP) .................................... 21172120

(51) Int. Cl.
*H04W 72/12*     (2023.01)
*H04W 28/02*     (2009.01)
(52) U.S. Cl.
CPC ....... *H04W 28/0231* (2013.01); *H04W 72/12* (2013.01)

(58) Field of Classification Search
CPC .......................... H04W 28/0231; H04W 72/12
See application file for complete search history.

(56) References Cited

U.S. PATENT DOCUMENTS

| | | | | |
|---|---|---|---|---|
| 10,084,728 | B2 * | 9/2018 | McCann | ................. H04L 49/70 |
| 11,889,531 | B2 * | 1/2024 | Juretzek | ................ H04W 72/30 |

(Continued)

FOREIGN PATENT DOCUMENTS

| | | | |
|---|---|---|---|
| EP | 3633938 A1 | 4/2020 | |
| WO | WO-2020245844 A1 * | 12/2020 | ........ H04W 28/0289 |

OTHER PUBLICATIONS

Fang Wang et al., "Online Content Dissemination in Hybrid Broadcast-Unicast Networks," IEICE Transaction on Communication, vol. E96B, No. 6, Dated: Jun. 1, 2013, pp. 1551-1558.

(Continued)

*Primary Examiner* — Fahmida S Chowdhury
(74) *Attorney, Agent, or Firm* — Patterson + Sheridan, LLP

(57)     ABSTRACT

The present disclosure provides a network manager comprising a data interface configured to communicatively couple to at least one radio access network, and to communicatively couple to a load data source network; and a network controller configured to receive request data with regard to the transmission of a load data from the load data source network, to provide configuration proposal data defining at least one set of radio access network resources for transmission of the load data based on the request data; and to output the configuration proposal data in response to the request data; wherein the data interface is configured to receive confirmation data in response to the configuration proposal data; and wherein the network controller is configured to provide configuration data based on the confir- (Continued)

mation data to at least one radio access network. Further, the present disclosure provides a respective method.

16 Claims, 4 Drawing Sheets

(56) References Cited

U.S. PATENT DOCUMENTS

| | | | | |
|---|---|---|---|---|
| 2005/0172016 | A1* | 8/2005 | Kossi | H04L 69/14 |
| | | | | 710/14 |
| 2007/0058561 | A1* | 3/2007 | Virgile | H04M 15/81 |
| | | | | 370/468 |
| 2009/0247116 | A1* | 10/2009 | Sennett | H04W 4/90 |
| | | | | 455/404.2 |
| 2011/0145317 | A1* | 6/2011 | Serban | H04W 4/00 |
| | | | | 709/238 |
| 2013/0103786 | A1* | 4/2013 | Miglore | G06F 16/183 |
| | | | | 709/217 |
| 2015/0282119 | A1* | 10/2015 | Mcevilly | H04W 24/10 |
| | | | | 370/312 |
| 2018/0176851 | A1* | 6/2018 | Lim | H04W 40/12 |
| 2019/0281541 | A1* | 9/2019 | Zhang | H04W 60/00 |
| 2020/0092685 | A1* | 3/2020 | Fehrenbach | H04W 72/23 |
| 2020/0287788 | A1* | 9/2020 | Triplet | H04L 9/3297 |
| 2022/0167331 | A1* | 5/2022 | Huang | H04W 28/16 |
| 2022/0167456 | A1* | 5/2022 | Jia | H04W 24/04 |
| 2023/0397194 | A1* | 12/2023 | Wang | H04W 72/121 |
| 2024/0244473 | A1* | 7/2024 | Taga | H04L 41/0816 |
| 2024/0381125 | A1* | 11/2024 | Taga | H04W 64/00 |

OTHER PUBLICATIONS

European Patent Office, extended European Search Report for Application 21172120.4-1216 dated Oct. 21, 2020.
PCT, Notification of Transmittal of The International Search Report and The Written Opinion of The International Searching Authority, or The Declaration for Application PCT/EP2022/062009 dated Aug. 4, 2022.

* cited by examiner

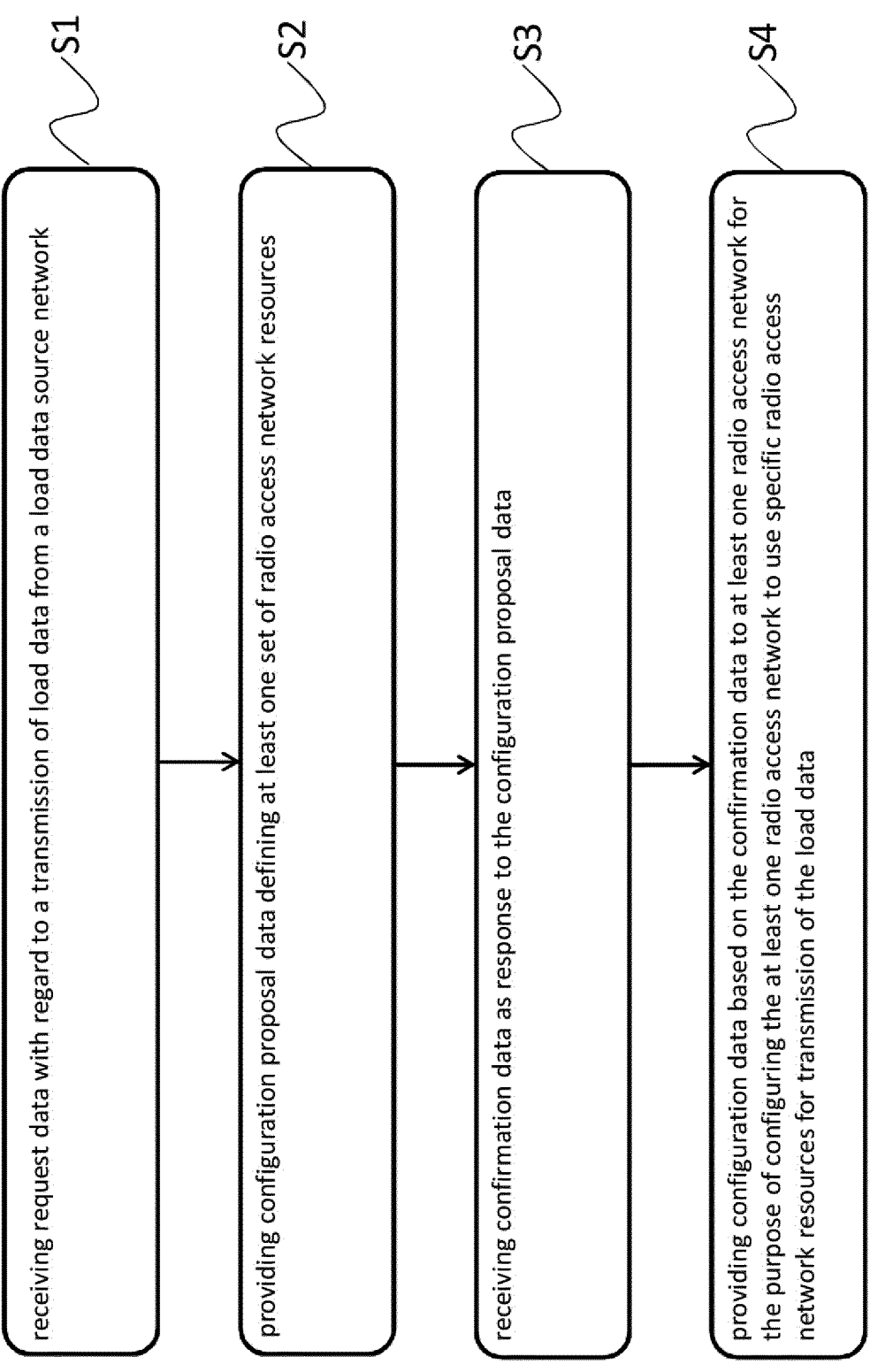

receiving request data with regard to a transmission of load data from a load data source network /S1 providing configuration proposal data defining at least one set of radio access network resources /S2 receiving confirmation data as response to the configuration proposal data /S3 providing configuration data based on the confirmation data to at least one radio access network for the purpose of configuring the at least one radio access network to use specific radio access network resources for transmission of the load data /S4

Fig. 4

NETWORK MANAGER AND METHOD

TECHNICAL FIELD

The disclosure relates to a network manager and a respective method.

BACKGROUND

Although applicable to any combination of different networks, the present disclosure will mainly be described in conjunction with broadcast networks and cellular networks.

Today, the number of communication devices that are served in cellular networks increases steadily. One source of new communication devices is the increasing demand of users for mobile voice and data communication. Other sources of this increase are new applications, like Internet-of-Things or IoT devices.

With an increasing number of communication devices, cellular networks become more and more complex. Consequently, the technical and financial efforts required for building and managing such networks continually increase.

There is a need for reducing these efforts.

SUMMARY

The above stated problem is solved by the features of the independent claims. It is understood, that independent claims of a claim category may be formed in analogy to the dependent claims of another claim category.

Accordingly, it is provided:

Network manager comprising a data interface configured to communicatively couple to at least one radio access network of a broadcast network that is configured to wirelessly emit a load data signal, and to communicatively couple to a load data source network; and a network controller communicatively coupled to the data interface and configured to receive request data with regard to the transmission of the load data from the load data source network, to provide configuration proposal data defining at least one set of radio access network resources for transmission of the load data based on the request data; and to output the configuration proposal data as response to the received request data; wherein the data interface is configured to receive confirmation data as response to the configuration proposal data, the confirmation data referring to one set comprised in the configuration proposal data; and wherein the network controller is configured to provide configuration data based on the confirmation data to the at least one radio access network, for the purpose of configuring the at least one radio access network to use specific radio access network resources for transmission of the load data.

Further, it is provided:

A method for managing a broadcast network, the method comprising receiving request data with regard to a transmission of load data from a load data source network; providing configuration proposal data defining at least one set of radio access network resources for transmission of the load data based on the request data as response to the received request data; receiving confirmation data as response to the configuration proposal data, the confirmation data referring to one set comprised in the configuration proposal data; and providing configuration data based on the confirmation data to the at least one radio access network for the purpose of configuring the at least one radio access network to use specific radio access network resources for transmission of the load data.

The present disclosure acknowledges the fact that serving more devices in cellular networks increases the complexity of the networks, since smaller cells need to be provided, or more capable transmitters need to be provided, to serve the increased number of devices. With increasing capabilities, the complexity and therefore also the costs for the transmitters raise. The same may apply to the power consumption of such transmitters. Operating the cellular network therefore becomes more demanding technically and economically.

When planning a cellular network, the operator of the network may estimate the average load on the cellular network and dimension the cellular network accordingly. However, when a cellular network is dimensioned for an average load, the cellular network may experience congestion and overload situations.

Such situations may for example arise when an important event, like a live sports event is viewed by many users on their mobile devices. The data stream comprising e.g., video and audio data for such a sports event, needs to be provided to all transceivers of the cellular network that currently serve at least one user that wants to view the event. In addition, users today expect a flawless experience, where the video and audio data is distributed with low latencies and high quality, an expectation that is difficult to meet, especially under high-load conditions.

This is especially true, since mobile cellular networks have been based, and still rely on a strong unicast communication model to provide various services to their end users. However, nowadays consumers find their comfort while watching a huge amount of premium content, of which a high percentage is live media services.

On the other hand, broadcast networks are well established for broadcast and multicast data transmission like TV and radio transmissions via digital video broadcast like DVB-T, for terrestrial transmission, or DVB-S, for satellite transmission. Since broadcast networks are usually designed to provide broadcast or multicast one-way data transmission, these networks may operate efficiently with any number of receiving devices. Further, since the area of coverage of a transmitter of a broadcast network is larger than the area of coverage of a transmitter of a cellular network, which is especially the case for satellite-based broadcast networks, the network infrastructure of broadcast networks is less complex to build and maintain than the infrastructure of cellular networks.

The present disclosure acknowledges that users will demand more and more services from cellular networks on their mobile devices that either require overprovisioning or may lead to congestion in the cellular networks. The present disclosure, therefore, provides means for effectively using the infrastructure provided by broadcast networks to provide data to devices that usually operate in cellular networks.

A cellular network in the context of the present disclosure may be a communication network providing bi-directional wireless communication for electronic devices, like user equipment such as mobile phones, also called UE, IoT devices and the like. Usually, a cellular network is a distributed network comprising "cells", wherein each cell is served by at least one fixed-location transceiver. A site hosting the fixed-location transceivers may also be called a base station. A cellular network usually allows transmission of voice, video and audio data and other types of content. Neighboring cells usually use different sets of frequencies to avoid interference between the single cells. Mobile devices in the cellular network may perform a hand-over when moving from one cell to another. All cells together form the cellular network and provide radio coverage over a wide geographical area, wherein small local cells, e.g. indoor cells, are also possible. A cellular network in the context of the present disclosure may also comprise a satellite-based cellular network. Such a satellite-based cellular network may offer bidirectional communication to receiving devices in small cells with low flying satellites. Usually, such a satellite-based cellular network will comprise a large number of satellites. These types of satellite-based cellular network may be designed for unicast data communication.

The single transceivers of a cellular network are usually communicatively coupled to a common network, also called core network or backbone network. Data may be served to the transceivers from the common network and may be provided from the transceivers into the common network. It is understood, that the common network not necessarily is a single network, but may also comprise different network segments that may be communicatively coupled to each other via other networks, like e.g. the internet or dedicated backbone networks.

In cellular networks traditionally, a point-to-point communication is performed, like e.g. when a telephone call is conducted between to devices. In modern cellular networks like e.g., 5G networks, multicast transmissions are also possible. Due to the limited size of the single cells in a cellular network, the data to be transmitted in a multicast mode hast to be transmitted to every single transceiver via the common network.

In the context of the present disclosure, the operator of a cellular network may also be called the MNO or mobile network operator.

A broadcast network in the context of the present disclosure may be a one-way communication network that usually provides at least one of audio communication and/or video communication in a one-way or unidirectional fashion to electronic devices, like radio receivers or TV sets. It is understood, that a broadcast in the context of the present invention may be terrestrial broadcast network, a satellite broadcast network or a combination of both.

It is understood, that in the context of the present disclosure, a broadcast network may also provide communication to devices that are usually served by cellular networks. Further, in the context of the present disclosure a broadcast network is not limited to broadcast transmissions, but may also provide multicast transmissions. A broadcast transmission in this context is to be understood as a transmission to all receivers within reach of a single transmitter. A multicast transmission in this context is to be understood as a transmission to a limited group of receivers within reach of a single transmitter, instead of all receivers.

A broadcast network may be formed by a group comprising of at least one of a plurality of radio stations a plurality television stations, or combined radio and television stations, or satellite stations. The term radio station refers to equipment for transmitting audio content wirelessly e.g., over the air. The term television station refers to equipment for transmitting audio and video content wirelessly e.g., over the air. The term satellite station refers generally to a satellite that is communicatively linked to a ground station and may be used as a radio access network or transmitter in the broadcast network.

It is understood, that for a broadcast network a common network, also called core network, may be provided that couples to the single transmitters, as explained above for cellular networks. If one or more satellites are part of the broadcast network, the respective ground stations may be communicatively coupled to the core network of the broadcast network. Since the area of coverage of a transmitter of a broadcast network is larger than the area of coverage of a transmitter of a cellular network, the common network needs to connect to a smaller number of transmitters and therefore usually is of lower complexity than the common network of a cellular network.

As explained above, the geographical area covered by each of the transmitters of a broadcast network is larger than the geographical area covered by each of the transmitters of a cellular network. In embodiments, the geographical area covered by each of the transmitters of a broadcast network may comprise an area larger than the geographical area covered by at least two transmitters of a cellular network, i.e. larger than two cells of the cellular network.

In examples, the area covered by a single terrestrial transmitter of a broadcast network may comprise a radius of about 1 km up to more than 100 km. The area covered by a single transmitter of a cellular network may comprise a radius of up to 35 km. At the same time, the transmitting power of a transmitter in a broadcast network may range up to 20 KW. In cellular networks, the transmitting power of the respective transmitters may range up to 500 Watts. Further, the transmitters in broadcast networks will usually use other frequencies than the transmitters in cellular networks. The transmitters in the broadcast networks may for example use frequencies in the UHF band, for example between 470 MHz and 698 Mhz.

For satellites as transmitters, the size of the area of coverage may be size of the full earth globe, and the transmission power may be between 20 W and 300 W (depending on the bands and the usage).

Exemplary standards used in broadcast networks may comprise DVB-based protocols, especially DVB-T and DVB—S based protocols, ATSC-based protocols, and 5G for broadcast networks or any future broadcast network standard. In cellular networks, the respective standards like UMTS, LTE and 5G or any future cellular network protocol may be used.

In the context of the present disclosure, the operator of a broadcast network may also be called the BNO or broadcast network operator.

The cellular networks and the broadcast networks mentioned in the present disclosure may comprise so called radio access networks or RANs and core networks or CNs. A RAN or Radio Access Network provides a radio access technology, and usually resides between a user device and the respective CN. A RAN in the context of the present disclosure may comprise the base station with respective antennas and a connection to the CN, and/or a satellite with connection to the CN via a respective ground station.

The radio access networks, also called RANs, and core networks, also called CNs, mentioned in the present disclosure are not limited to a specific type of network. Nevertheless, in the present disclosure a RAN with regard to cellular networks may comprise at least one of a GRAN, also GSM radio access network, a GERAN, which is essentially the same as GRAN but specifying the inclusion of EDGE packet radio services, a UTRAN, also called UMTS radio access network, and an E-UTRAN, the Long Term Evolution (LTE) high speed and low latency radio access network, or a RAN according to any upcoming RAN standard, or satellite-based RAN.

Accordingly, in the present disclosure a RAN with regard to a broadcast network may comprise any technology that allows transmitting data in a broadcast or multicast manner to electronic devices. Such a RAN may for example comprise a DVB-T transmitter with respective antennas and a connection to the respective core network, or a satellite as DVB-S transmitter with respective antennas and a connection to the respective core network via the ground station of the satellite.

Possible RANs comprise, but are not limited to, multifrequency network or MFN RANs, single frequency network or SFN RANs, and SC-PTM RANs, also called Single-Cell—Point-to-Multipoint RANs. The RANs in the context of the present disclosure may for example comprise so called LPLT transmitters, also called low-power low-tower transmitters, HPHT transmitters, also called high-power high-tower transmitters, MPMT transmitters, which are a hybrid transmitter combining elements of LPLT and HPHT transmitters. MPMT stands for Medium Power Medium Tower. MPMT transmitters may have an output power that comes in between LPLT and HPHT, e.g. 350 W-6 KW, which automatically results in a coverage capability between those of LPLT and HPHT, e.g. 5 KM-30 KM, depending on the specific deployment scenarios and other parameters. Further, a RAN in the context of the present disclosure may comprise at least one transmitter with a fixed geographical location. As explained above, a transmitter for a broadcast network may comprise a transmitting power of up to 20 KW or more, and cover an area of more than 100 km radius.

The term core network in the context of the present disclosure refers to a network that couples to the RANs of the respective network. Core networks are sometimes also referred to as backbone networks. It is understood, that any networking technology, like cable-based ethernet, optical fiber-based ethernet, or other network technologies may be used to transmit data in the core network to and from the RANs. The core network may further comprise connections to other networks, like the networks of content providers or the like.

It is understood, that radio access networks and core networks in the context of the present disclosure may comprise further elements, like network connections, network switches, network hubs, servers, and the like.

The present disclosure acknowledges, as indicated above, that data may be offloaded from load data source networks, like cellular networks, to a broadcast network. To support offloading of load data to the broadcast network, the present disclosure provides the network manager.

The network manager comprises a data interface that communicatively couples a network controller to at least one radio access network of the broadcast network and a load data source network. Such a load data source network may be the core network of the broadcast network. The core network usually transports load data to the radio access networks for emission in a load data signal to the receiving devices.

It is understood, that the load data source network and the radio access networks may be operated by the same operator. The network controller may therefore be coupled via a single network to the load data source network and the radio access networks. Communicatively coupled in this context refers to the data interface being capable of communicating with the respective entity, while a direct network connection or indirect network connection e.g., via other networks like the internet, is possible.

Further, the data interface may comprise a single hardware interface or multiple hardware interfaces. In other examples, the load data source network and the radio access networks may be operated by different operators and may not be provided in the same network. The data interface in such an example may communicatively couple to the different operators' networks as required directly or indirectly via a single or multiple hardware interfaces.

The network manager of the present disclosure may be provided in the broadcast network. In such an embodiment the data interface may be an internal interface in the broadcast network. The network manager may for example be provided as dedicated element, like a server in the broadcast network. Such a server may be communicatively coupled to the core network of the broadcast network via a hardware-based data interface, like an Ethernet interface. The network manager may also be provided as an additional function in a server that is already present in the core network. Such a network manager may for example be provided as software application in the server or a function of a firmware or operating software of the server. Such a network manager may comprise the data interface as a software-based interface, like an API, or as a combination of a software-based and hardware-based interface.

The core network is usually communicatively coupled to at least one radio access network. It is understood, that the broadcast network may comprise any number of radio access networks that may all be coupled, directly or indirectly, to the core network. The single radio access networks may be distributed over a specific geographical area like e.g., a country or simply the area of operation of a network operator that operates the broadcast network. The core network distributes load data to the radio access networks that is to be distributed or emitted via the radio access networks. It is understood, that the core network may comprise routing mechanisms that allow transmitting specific pieces of load data only to those radio access networks that should emit the load data in respective load data signals. It is understood, that the load data refers to the content or content data that is to be transmitted to receiving devices. Such load data may comprise video data, audio data, software update data, or any other type of data that is to be transmitted.

It is understood, that the core network may comprise a respective interface or respective interfaces that allow operators of cellular networks or other content providers to provide the load data to the core network. Such interfaces may comprise hardware-based network interfaces, API-based or software-based interfaces, or a combination of both. The core network may for example be coupled via a hardware interface to a network of a content provider or cellular network operator directly or indirectly. The load data may be provided to the core network via an upload functionality that is provided by the core network. It is understood, that such an upload functionality may comprise security measures, like e.g. authentication and encryption. In embodiments, the core network may for example comprise one or more FTP or HTTP(S) servers, that allow a content provider to upload the load data. In case of live streaming data, the core network may also provide a streaming endpoint, that accepts the load data in the form of a stream for further processing in the core network. In other embodiments, the broadcast network e.g., a network controller or other elements of the core network, like a data loader, may be configured to retrieve the load data from a location that may be indicated by the provider of the load data.

If, as indicated above, the network manager is provided as part of the broadcast network, the request data as provided to the core network is directly available for the network manager. This is especially true, if the network manager is provided in an element of the core network.

The network manager may however also be provided outside of the broadcast network. This allows providing the function of the network manager as an external service to operators of broadcast networks.

In such embodiments, the network manager may be provided as a dedicated service. The expression dedicated service includes providing the service from a dedicated server, a virtualized server, as a cloud-based service, or any other form of providing the respective functionality. The data interface of such a network manager may comprise a hardware-based interface, like an Ethernet interface, a software-based interface comprising respective API-functions, upload and download functions, and control functions, or a combination of both.

If the network manager is not provided in the broadcast network, the request data in the load data source network is not directly available to the network manager. The data interface may therefore be capable of passively receiving and/or actively retrieving the request data from the load data source network. The load data source network may for example comprise a cellular network, a content distribution network or other content provider networks.

The network controller receives the request data, that may be seen as a kind of metadata for the load data via the data interface, and provides respective configuration proposal data. The configuration proposal data defines parameters for how the load data should be emitted via the radio access networks i.e., the radio access network resources. The request data therefore indirectly defines which radio access network resources should be used for emission of the load data signal, without explicitly stating the radio access network resources. The request data may however also define or request specific radio access network resources for transmission of the load data directly.

The network controller receives the request data that may refer to general requirements for the transmission of the load data. The request data may for example only indicated a time for transmission of load data. It is understood, the term "time" in the context of the present disclosure may refer to a specific point in time or time range and to a respective date like e.g., 12:00 on Saturday, or 13:00-15:00 on May 5. Of course, a year may also be included, while the next possible day may be assumed, if the year is not included.

The network controller may now identify possible combinations of radio access network resources that may be used to fulfill the requirements provided in the request data. The identified sets of radio access network resources are provided in the configuration proposal data as a response to the request data.

If, for example, a cellular network operator requests in the request data the transmission of load data between 16:00 and 18:00 next Sunday, the network controller may provide possible geographical locations or areas for the transmission as the second radio access network resources. The configuration proposal data may for example comprise the information that a data transmission is possible between 16:00 and 18:00 next Sunday, in Germany.

The network controller may provide multiple sets of radio access network resources referring to the same type of radio access network resource, but comprising different values for the radio access network resources. In the above example, the network controller may for example indicate that a transmission would be possible in Germany, France, Spain, Italy, etc. if this would be the case. Instead of single countries, the network controller could also include regions like e.g., Europe, North America, or the like in the configuration proposal data.

The provider of the load data may request the transmission of the load data based on the configuration proposal data by providing respective confirmation data to the broadcast network. The confirmation data refers to the respective set of radio access network resources in the configuration proposal data. This also comprises the confirmation data comprising or defining the respective radio access network resources.

For transmission of the load data, the relevant radio access networks are then provided with the configuration data by the network controller based on the received confirmation data. The configuration data will allow the radio access networks to emit the load data signal as requested in the confirmation data. If the configuration data indicates that the load data should only be distributed in specific areas, the network controller may also identify the relevant radio access networks and provide the configuration data to the respective radio access networks only. The load data source network may also be instructed to provide the load data to the respective radio access networks only. In order to provide the configuration data, the network controller may convert the information in the configuration proposal data into respective configuration data, that is understood by the radio access networks.

It is understood, that the network controller may provide the configuration data to the radio access networks prior to the load data source network providing the load data to the respective radio access networks. To this end, the configuration data may identify the load data with a respective identifier that may be provided in the configuration data and the load data. This allows for example pre-configuring the radio access networks when the request data and confirmation data is received, which may be long before the load data is to be emitted, and therefore long before the load data is provided to the core network of the broadcast network or the radio access networks. This may for example be the case, when a cellular network operator reserves radio access network resources for the transmission of a live event, like a sports event or a live concert, long before the event is happening.

The radio access networks may comprise respective controllers that receive and store the configuration data and control the transmitter elements in the radio access networks accordingly. In modern network architectures, single elements may be virtualized. Therefore, the controllers of the radio access networks may also be provided as virtualized controllers in a server that is provided in the core network of the broadcast network. Respective configuration data may then be provided from the virtualized controllers to the other elements of the radio access networks. It is understood, with the possibility of virtualizing network elements, that an element that is disclosed in the present disclosure as being part of or being comprised by another element, may be functionally linked to the other element. At the same time such an element may be virtualized and provided at another location but linked via respective data connections to the other element.

It is understood, that the configuration data and the load data may be provided to the radio access networks as separate information, especially if the configuration data is provided before the load data. However, in cases where the configuration data is provided at the same time as the load data, the configuration data and the load data may be provided to the radio access networks as combined data. The network controller may for example receive the load data via the data interface and provide the configuration data as a header to the load data. Alternatively, the network controller could provide the configuration data to the load data source network, which could add the configuration data as header data to the load data. This also allows dynamically changing the configuration data for different segments of the load data that comprise a dedicated header.

A broadcast network in the context of the present disclosure is capable of dynamically receiving the load data from e.g., a cellular network, and of transmitting the load data to electronic devices, that usually receive the load data via the cellular network. Instead of by a cellular network, the load data may also be provided directly by a content distribution network or other content providers. The network manager will control how the load data is emitted by the radio access networks of the respective broadcast network and prior to defining respective radio access network resources provide at least one proposal to a provider of the load data.

The network controller automatically defines at least one complete set of radio access network resources based on the request data indicated by the providers of the load data. Via the confirmation data the provider may then actively select on of the sets that the network controller automatically provided and initiate or reserve the transmission of the respective load data.

Especially for cellular networks, the broadcast network provides a kind of backup network or offloading network for high load situations. Further, via the network controller, an operator of such a network, like a cellular network, may dynamically offload load data into the broadcast network. It is understood, that the respective receiving devices may be informed via the respective network e.g., the cellular network, about the transmission of the load data via the broadcast network.

Further embodiments of the present disclosure are subject of the further dependent claims and of the following description, referring to the drawings.

In an embodiment the at least one radio access network resource may comprise at least one of a geographical location for transmission of the load data, a frequency range or bandwidth for transmission of the load data, a transmission time or time slot for transmission of the load data, and a modulation scheme for transmission of the load data. In another embodiment, the request data may comprise at least one of a priority of the load data, a quality for transmission of the load data, a data rate or bandwidth for transmission of the load data, a transmission time or time slot for transmission of the load data, a geographical location for transmission of the load data, encryption information for the load data, types of intended receiving devices for the load data signals, a frequency range for transmission of the load data, and wireless radio access network resources for transmission of the load data.

The radio access network resources may refer to at least one of a geographical location for transmission of the load data, a frequency range or bandwidth for transmission of the load data, a transmission time for transmission of the load data, and a modulation scheme for transmission of the load data. Generally, the radio access network resources define parameters for configuration of the radio access network. Other possible radio access network resources may refer to Cyclic Prefix, CP, Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network).

In contrast the request data defines general requirements of the provider of the load data, like quality requirements, and the like.

Request data may refer to the priority of the load data. The priority of the load data defines how important it is to emit the load data for the provider of the load data e.g., a cellular network provider or a content distribution network. Load data with a higher priority may be preferred when assigning radio access network resources for the respective load data. The provider of the load data may define the priority in the request data, and the operator of the broadcast network may for example bill the provider of the load data based on, but not necessarily exclusively, the priority defined for the load data.

Other request data may refer to a quality for transmission of the load data. The quality may refer to a bit rate of the load data or a coding quality used for encoding the load data. Further request data may refer to a codec used for encoding the load data. These types of request data may be relevant especially with video and audio data, and may influence the perceived quality of the video or audio at the receiving devices.

Further request data may refer to the data rate or bandwidth reserved for the transmission of the load data. Depending on the type of the load data, the provider of the load data may for example accept a very low data rate or may require a high data rate for the transmission of the load data.

If the load data for example comprises a live video stream in 4K resolution that is encoded with a predetermined video codec, the provider of the load data may request the bit rate or bandwidth that is required for the transmission of the video stream. If in contrast, the load data is a firmware update for IoT devices, the time required for transmission of the load data may not be critical. The provider of the load data may therefore indicate or accept a low data rate or bandwidth for the transmission of his load data.

Other request data may refer to a transmission time for transmission of the load data, or a geographical location or region for transmission of the load data. The request data may for example request the load data to be transmitted at a specific time and a specific region. Such request data may for example be used to control the emission of load data that is temporarily required in specific regions. Possible load data for a temporary and local transmission may for example refer to live sports events that need to be broadcast in a specific region at the exact time of the live sports event. The request data may for example comprise that the load data should be transmitted in a specific area, for example southern Germany, on a specific day and a specific time, and will last about 2.5 hours. Instead of a general region, like southern Germany, the request data may also specify a transmitter location, like e.g. Wendelstein or Ismaning, which are located in southern Germany. Other exemplary request data may for example indicate that specific load data should be transmitted 24 hours every day and in a hole country or over a hole continent.

A request data may also refer to an encryption information for encrypting the load data. This type of request data may be used e.g. to control access to the load data or to ensure integrity of the load data. With such an encryption-related request data, the encryption may be performed in the core network or the radio access networks.

In addition, a request data may refer to types of intended receiving devices for the load data signals. The data transmission may for example be configured differently for reception by mobile UEs e.g., smartphones or the like, or by stationary IoT device, also called internet of things devices.

Request data may also refer to wireless radio access network resources for transmission of the load data, like for example at least one of a frequency range for transmission of the load data, a modulation scheme used for transmission of the load data, Cyclic Prefix, CP, Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network).

It is understood, that not all of the above-mentioned types of request data need to be explicitly defined. Some of the request data may for example be derived from the load data or may be defined by the network controller. For example, a coding quality, or a bit rate, or a used codec or the like may be derived from audio or video load data.

As indicated above, the network controller may provide in the configuration proposal data a set of radio access network resources, that allow the provider of the load data to select the required radio access network resources for transmission of the load data.

In embodiments, the provider of the load data may also indicate in the request data, which radio access network resources may be freely chosen in the broadcast network, and which radio access network resources need to be set according to the request data.

The provider of the load data may for example define that he requires the transmission of load data in a specific region, at a specific time. At the same time the provider may indicate, that the frequency range and the modulation scheme for the transmission of the load data may be freely chosen.

The network controller may in such cases provide in the configuration proposal data an indication of the possible data rate or bandwidth. If the load data comprises video data, this information also defines or limits the possible resolution of the video data.

The provider may for example be informed in the configuration proposal data, that transmission of a Full-HD video would be possible at the requested geographical location at the requested time. Multiple sets of radio access network resources may be provided in the configuration proposal data, and for example indicate that a Full-HD video may be transmitted if the video is encoded with a first codec or that a 4K video may be transmitted if the video is encoded with a second (more powerful) codec. In another embodiment, the network controller may be configured to provide the configuration proposal data based on a radio access network resources schedule of the broadcast network, the radio access network resources schedule comprising information about reservations of radio access network resources for the broadcast network.

The radio access network resources schedule represents the availability of the radio access network resources for different points in time in the broadcast network. The radio access network resources schedule, therefore, allows identifying possible combinations of radio access network resources for the transmission of load data, that is requested via the request data for specific points in time.

The radio access network resources schedule may be stored in the network controller or a dedicated storage, like a database, and may comprise information about reservations or utilizations of the single radio access network resources. It is understood, that the radio access network resources schedule may apply only to those radio access network resources that are limited.

Further, the radio access network resources schedule may be provided in any adequate format. The radio access network resources schedule may for example be based on time-slots, and may indicate for a specific radio access network resource, which time slots are occupied by the respective radio access network resource. In another embodiment, the radio access network resources schedule instead of using time slots, may indicate for every radio access network resource a start time and an end time. This allows more flexibly reserving the single radio access network resources without being bound to the time slots.

When used in combination with the below-mentioned user-accessible interface that is accessible via a data network, the radio access network resources schedule may be shown in calendar form.

The radio access network resources schedule may further store the amount that is available of every radio access network resource. This information may in embodiments be stored individually for single elements of the broadcast network. For example, different radio access networks may comprise different transmitters with different capabilities regarding e.g., bandwidth, modulation schemes, frequency ranges, and the like. If the radio access network resources schedule stores such information individually for all elements of the broadcast network, it is possible to effectively select all available radio access network resources for a transmission of load data.

The network controller assembles the configuration proposal data, that serves as a suggestion to the provider of the load data and the request data i.e., the initial request, based on the radio access network resources schedule.

This means, that the network controller may select radio access network resources that are compatible with the at least one radio access network resource, and that are available according to the radio access network resources schedule.

In yet another embodiment, the network manager may comprise a provider data storage configured to store a provider data set for at least one provider of the load data, the provider data set comprising at least one of allowed radio access network resources and limits for radio access network resources for the respective provider. Further, the network controller may be configured to generate the configuration proposal data based on the stored provider data sets.

In embodiments, the network manager may implement a kind of user management for the providers of the load data and the request data by storing the provider data sets for the single providers.

The user management may for example define login data for the providers of the load data and the request data. Further, the user management may define restrictions for the providers of the load data and the request data, that may restrict the options provided to the providers of the load data and the request data, especially regarding the content of the request data or the configuration proposal data that is defined based on the request data. Further, these restrictions may also refer to the format of the load data, the amount of load data and the like.

It is understood, that restriction imposed on the amount of load data may in embodiments be dynamic restrictions that may e.g. be based on a daily, monthly or yearly individual quota for the providers of the load data and the request data.

Other parameters that may be restricted may refer e.g., to a data rate, a content encoding, a content encryption, and the like. It is understood, that providers of the load data and the request data may be offered to upgrade restricted parameters of the load data, e.g. by paying a respective fee.

The provider data sets may for example be set according to a service level agreement between the respective provider and the operator of the broadcast network or the network manager.

In addition, a provider of load data may also define limits in the request data. The provider may for example define, that he is only interested in transmission of video data with a resolution between Full-HD and 4K. Lower and higher resolutions may therefore be discarded by the network controller when providing configuration proposal data to this provider.

In an embodiment, the network manager may comprise a load estimator configured to estimate a transmission load in the broadcast network for the transmission of the load data based on the request data. Further, the network controller may be communicatively coupled to the load estimator and is configured to provide the configuration proposal data further based on the estimated transmission load.

The term transmission load refers to the load in the broadcast network i.e., to the usage or occupation of the resources of the broadcast network, and therefore implicitly also to the free resources of the broadcast network, which may be calculated as the difference between all available resources of the broadcast network and the used resources of the broadcast network.

In order to estimate the transmission load, the load estimator may review the radio access network resources schedule to identify the already used radio access network resources.

Further, the load estimator may for example be provided with a list of important events, like sports events, live concerts or the like, that may be interesting for a larger audience. In other embodiments, the load estimator may also comprise an event discovery function, that searches for relevant events automatically e.g., via the internet. Such an event discovery function may for example comprise an artificial intelligence trained to identify event names, event types and event dates in search results.

Such an artificial intelligence may comprise a so called "named entity recognition" or "NER" function or element, that may be trained to identify events and dates. It is understood, that a full NLP or natural language processing pipeline may be provided that includes additional functions that may be executed before the NER function, like e.g., a tokenizer for segmenting a text into tokens, a tagger for assigning part-of-speech tags to tokens, and a parser for assigning dependency labels to the tokens.

Such an artificial intelligence may also be trained to generate respective search requests. For text generation the artificial intelligence system may for example use a pre-trained model that may be further trained on the individual problem of generating such search request, like the BERT model, or a GPT-family model.

If a type of event is known, the load estimator may use historical data of similar events to estimate the transmission load caused by such an event. The historical data may for example be provided by the content provider of the load data or from open information sources that indicate the size of the audience for that type of event in the past. The load estimator may also use historical data of the broadcast network itself.

If for example, a first match of the European Champions League was offloaded by a cellular network operator to the broadcast network, the load estimator may estimate that the other matches, or at least other matches between teams of the same countries or regions, may also be offloaded to the broadcast network.

The load estimator may also perform a geographical estimation. For example, the load estimator may estimate the transmission load for emitting load data regarding the European Champions League to be very low outside of Europe, but very high inside of Europe. The load estimator may also include details about the respective event in the geographical estimation. For example, the transmission load may be estimated higher for a respective region, if the respective event may awaken interest in many people of that region.

A live concert of a famous German singer may for example awaken interest in the whole country. In contrast, a soccer match of FC Bayern Munchen may awaken interest in the southern region of Germany.

In embodiments, the users of the receiving devices may also be questioned about their interest in the respective event, and the estimation may include the users' responses.

Summing up, the load estimator may estimate when and where large amounts of load data may be requested to be emitted by content providers, and provide this information to the network controller. The estimated transmission load may for example be provided as a value between 0 and 1, wherein 1 may denote the highest transmission load. In other embodiments, the load estimator may simply inform the network controller that a high, medium or low transmission load is expected.

It is understood, that an artificial intelligence system may not only be used for finding events. A further artificial intelligence system may also be used in the load estimator to determine the estimated transmission load.

The load estimator may be provided with the necessary info/parameters from previous transmissions/distribution i.e. a memory system that stores/knows which event has already been transmitted for example with which importance and related network load, at which time and in which area. The load estimator may then have an artificial intelligence-based function that is trained by both new transmission requests and the previous transmission history, if there is any. The artificial intelligence-based function may comprise a limited memory artificial intelligence-function.

The network controller may adapt sets of radio access network resources in the configuration proposal data according to the estimated transmission load.

If for example, high transmission load is estimated, the network controller may limit the radio access network resources such that the transmission load is increased as little as possible. If for example, the transmission of video load data is requested for a time of high estimated transmission load, the network controller may limit the bandwidth or data rate in the configuration proposal data, or may limit the video resolution for example to Full-HD, instead of offering 4K or 8K resolution.

The network controller may also include in the configuration proposal data an indication of the estimated transmission load. It is understood, that the indication not necessarily includes the exact estimated transmission load. Instead, the indication may comprise a value or indication that is derived from the estimated transmission load. The indication may also be provided in the form of 0 to 1 or high, medium or low transmission load.

The network controller may also calculate a cost value based on the estimated transmission load and provide the calculated cost value in the configuration proposal data. The cost value may refer to the technical cost, not the monetary cost. The technical cost may for example be expressed in terms of a quota relation. Under normal circumstances the quota relation may be 1:1. This means that the load data is accounted for with a 1:1 relation when assessing the amount of transmitted load data. In situations with a high estimated transmission load, the quota relation may be higher than 1:1, for example 1:1.5 or 1:2. This means that the actually transmitted load data is accounted for with a factor of 1.5 or 2, when assessing the amount of transmitted load data. In contrast, if the estimated transmission load is low, the quota relation may be lower than 1:1, for example 1:0.75 or 1:0.5. This means that the actually transmitted load data is accounted for with a factor of 0.75 or 0.5, when assessing the amount of transmitted load data.

In other embodiments, the cost value may also refer to monetary costs. In such embodiments, the cost value may be higher if the estimated transmission load is higher.

In a further embodiment, the network controller may be configured to define the configuration proposal data based on the stored provider data set for the respective provider and the estimated transmission load.

The above-mentioned quota available to a provider may be stored in the respective provider data set. Generally, the network controller may generate the configuration proposal data based also on the provider data sets of the user management and the estimated transmission load.

A provider may for example have a service level agreement with the operator of the broadcast network or the network manager that includes data transmission even if high transmission load is estimated. For this provider, the network controller may generate the configuration proposal data independently of the estimated transmission load.

For providers that have a service level agreement with the operator of the broadcast network that does not include the transmission of load data if high transmission load is estimated, the above-mentioned indications and limitations may apply.

In another embodiment, in the provider data set an automatic reservation threshold may be stored, and the network controller may be configured to provide the configuration data to the at least one radio access network based on the configuration proposal data prior to receiving the confirmation data, if the automatic reservation threshold is higher than the estimated load value.

The automatic reservation threshold may be provided by the respective provider of the load data. As indicated above, the estimated transmission load may influence the costs, technical or monetary, for transmitting the load data.

The providers of the load data may therefore set a limit for these costs in the form of the automatic reservation threshold. The network controller may automatically reserve respective radio access network resources via respective configuration data, if the estimated transmission load is below the automatic reservation threshold set by the respective provider.

It is understood, that such configuration data may be marked e.g., as "auto-booked", as long as the content provider does not actively request the transmission of the respective load data via confirmation data. At the same time a respective information may be provided to the provider in the configuration proposal data.

The content provider may then request the cancellation of the transmission of the load data, if he does not want to accept the suggested radio access network resources for the transmission of the load data.

In embodiments, a time limit may be set before the actual transmission of the load data and the cancellation may only be accepted by the network controller if it is received before the end of the time limit. A time limit may for example be set to be one or more days before the actual transmission of the load data, or only one or more hours before the actual transmission of the load data or some minutes before the actual transmission of the load data.

In yet another embodiment, the network manager may comprise a control interface communicatively coupled to the network controller and comprising an interface accessible via a data network, especially at least one of a web-based user-accessible interface, and an API-based machine-accessible interface, and a RESTful interface, and an XML-based or JSON-based interface, and a client-program-based interface.

The control interface is not limited to a specific type of interface and may comprise hardware-based network interfaces, API-based or software-based interfaces, or a combination of both. It is understood, that the control interface may provide security measures, like authentication and encryption, for the transmission of the control data.

The control interface may be provided as an interface that is easily accessible for human users. To this end, the control interface may for example be provided as a web-based user interface. Such a web-based user interface may be hosted on a server in the broadcast network and may deliver a respective interactive web page to a client program, like a web browser program.

Such an interactive web page may not only allow a user to provide the request data for respective load data. Such an interactive web page may also provide feedback to the user regarding his requests. Regional settings or parameters may for example be shown on a map. Frequency-related settings may for example be shown in a respective diagram, and the like.

In addition or as alternative to the human accessible control interface, a machine-accessible or API-based control interface may be provided. Such a control interface may allow interaction via a respective data format, like XML, JSON, or the like. It is understood, that a single endpoint may be defined for the API-based control interface or that different end-points may be defined, like in a RESTful interface.

It is understood, that a respective client program may also be provided that allows interaction via the control interface. Such a client program may use the machine-accessible version of the control interface and process the data for presentation to the user.

The control interface may provide a feedback about the availability of the radio access network resources that are requested as response to receiving request data. If the requested radio access network resources are available, the control interface may report accordingly.

In other examples, the control interface may indicate that the requested radio access network resources are not available. In addition, the control interface may provide an alternative or similar set or ranges of radio access network resources that may be used instead. It is understood, that the information about alternative radio access network resources may be requested by the control interface from the network controller.

Alternative or similar sets of radio access network resources may be identified by searching for sets of radio resources that only deviate from the request in one, two or three of the radio access network resources. The suggested set of radio access network resources may for example differ from the requested radio access network resources in the geographical region for emission of the load data, in the frequency range or bandwidth used for emitting the load data, in the time or time period used for emitting the load data. It is understood, that with the suggested set of radio access network resources another quota relation or price may also be provided. If for example, with the originally requested radio access network resources, the quota relation would have been 1:0.5, the suggested set of radio access network resources may comprise a data-wise more expensive quota relation, like 1:1 or a data-wise less expensive quota relation, like 1:0.25.

It is understood, that the provider data storage, and the load estimator may also be provided as a separate entities and not as part of the broadcast network or the network manager. This allows providing the functionality of the provider data storage, and the load estimator according to the present disclosure as external service to operators of existing broadcast networks.

In such an embodiment, the provider data storage, and the load estimator may comprise data connections to the network manager, the core network and/or the radio access networks for communicating with the network manager, the core network and the radio access network resources accordingly.

The present disclosure therefore explicitly is meant to disclose the provider data storage, and the load estimator as separate elements that are not part of a network manager, or broadcast network but that are communicatively coupled to a network manager or broadcast network.

Further, the present disclosure is also meant to expressly disclose a broadcast network comprising the network manager. Such a broadcast network may comprise at least one radio access network, a core network as load data source network, and a network manager.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which:

FIG. 4 shows a flow diagram of an embodiment of a method according to the present disclosure.

In the figures like reference signs denote like elements unless stated otherwise.

DETAILED DESCRIPTION OF THE DRAWINGS

Figure 1:
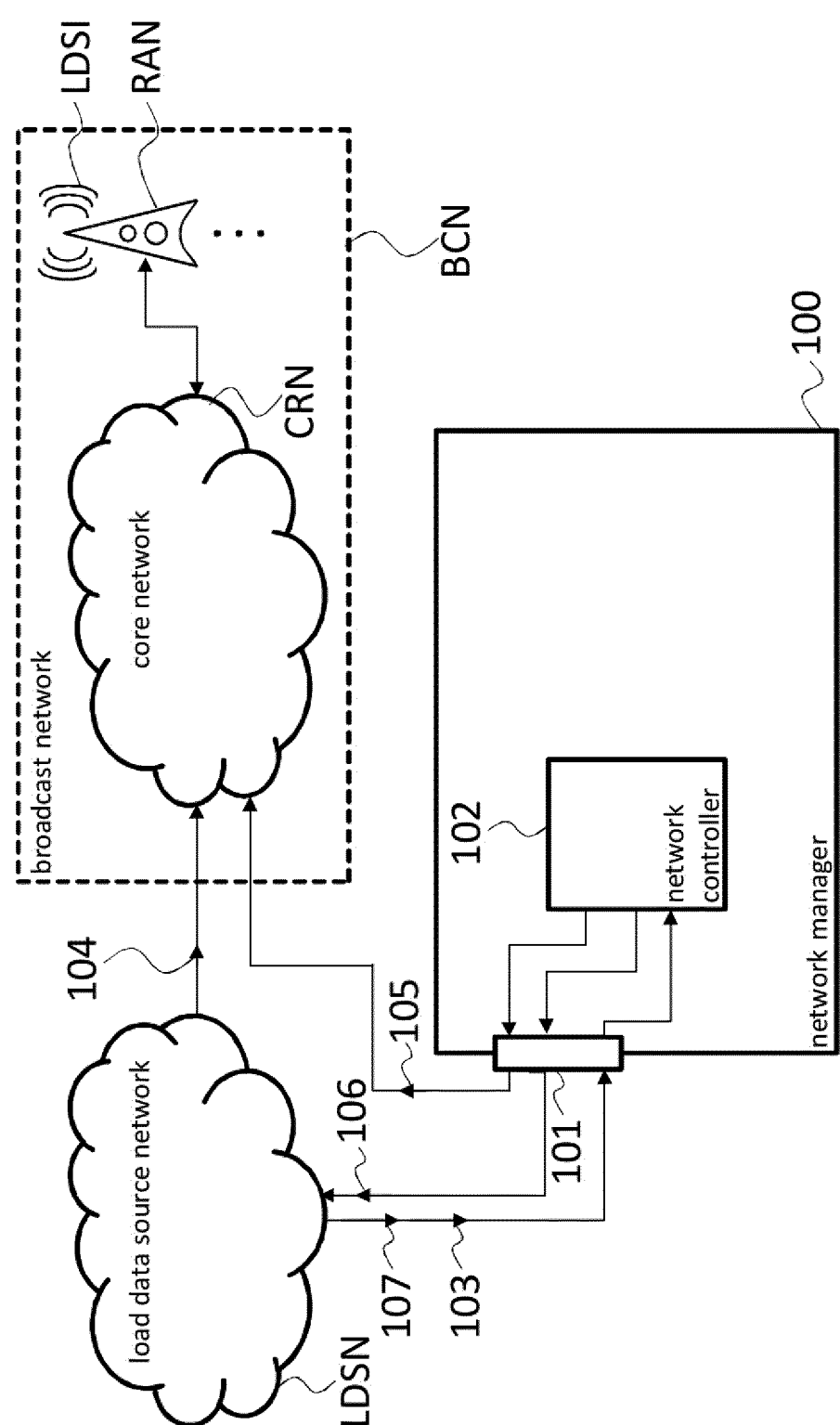
FIG. 1 shows a schematic diagram of an embodiment of a network manager according to the present disclosure, a load data source network and a broadcast network.

FIG. 1 shows a schematic diagram of a network manager 100 together with a load data source network LDSN and a broadcast network BCN.

The load data source network LDSN may be the network of a load data provider, like for example a streaming media service. It is understood, that the load data source network LDSN may comprise data storages, network devices and any other element required to provide the respective services offered by the load data source network LDSN.

The broadcast network BCN comprises a core network CRN that is communicatively coupled to a plurality of radio access networks RAN that emit wireless load data signals LDSI. For sake of clarity, only one radio access network RAN is shown, and more radio access networks RAN are hinted at by three dots. It is understood, that the broadcast network BCN may comprise any number of radio access networks RAN distributed over the area of operation of the operator of the broadcast network BCN. The core network CRN provides load data 104 to the radio access networks RAN for transmission to receiving devices in the load data signals LDSI. The load data 104 may be provided from the load data source network LDSN to the core network CRN directly.

In embodiments, the load data source network LDSN may be implemented as the core network CRN. In such embodiments, the load data 104 may be provided from any other source to the core network CRN. Further, it is understood, that the above-presented explanations regarding load data source networks and broadcast networks may be applied to the load data source network LDSN and the broadcast network BCN.

In addition, in other embodiments, the network manager 100 may be provided as component of the load data source network LDSN or as component of the broadcast network BCN, especially of the core network CRN.

The network manager 100 comprises a data interface 101 that is internally communicatively coupled to a network controller 102. Externally, the data interface 101 is communicatively coupled to the load data source network LDSN and to the broadcast network BCN.

The network controller 102 provides configuration proposal data 106 defining at least one set of radio access network resources for transmission of the load data 104 based on the request data 103. The network controller 102 then outputs the configuration proposal data 106 as response to the received request data 103 for example to the load data source network LDSN.

The network controller 102 receives via the data interface 101 confirmation data 107 as response to the configuration proposal data 106. If the confirmation data 107 indicates that the configuration proposal data 106 is accepted, the network controller 102 provides respective configuration data 105 based on the confirmation data 107 and the set comprised in the configuration proposal data 106 that is referred to in the confirmation data 107. The configuration data 105 may be provided via the core network CRN to the radio access networks RAN for the purpose of configuring the radio access network RANs to use specific radio access network resources for transmission of the load data 104.

The radio access network resources may for example comprise a geographical location for transmission of the load data 104 a frequency range or bandwidth for transmission of the load data 104, a transmission time or time slot for transmission of the load data 104, and a modulation scheme for transmission of the load data 104.

The request data 103 may comprise a priority of the load data 104, a quality for transmission of the load data 104, a data rate or bandwidth for transmission of the load data 104, a transmission time or time slot for transmission of the load data 104, a geographical location for transmission of the load data 104, encryption information for the load data 104, types of intended receiving devices for the load data signals LDSI, a frequency range for transmission of the load data 104, and wireless radio access network resources for transmission of the load data 104.

Figure 2:
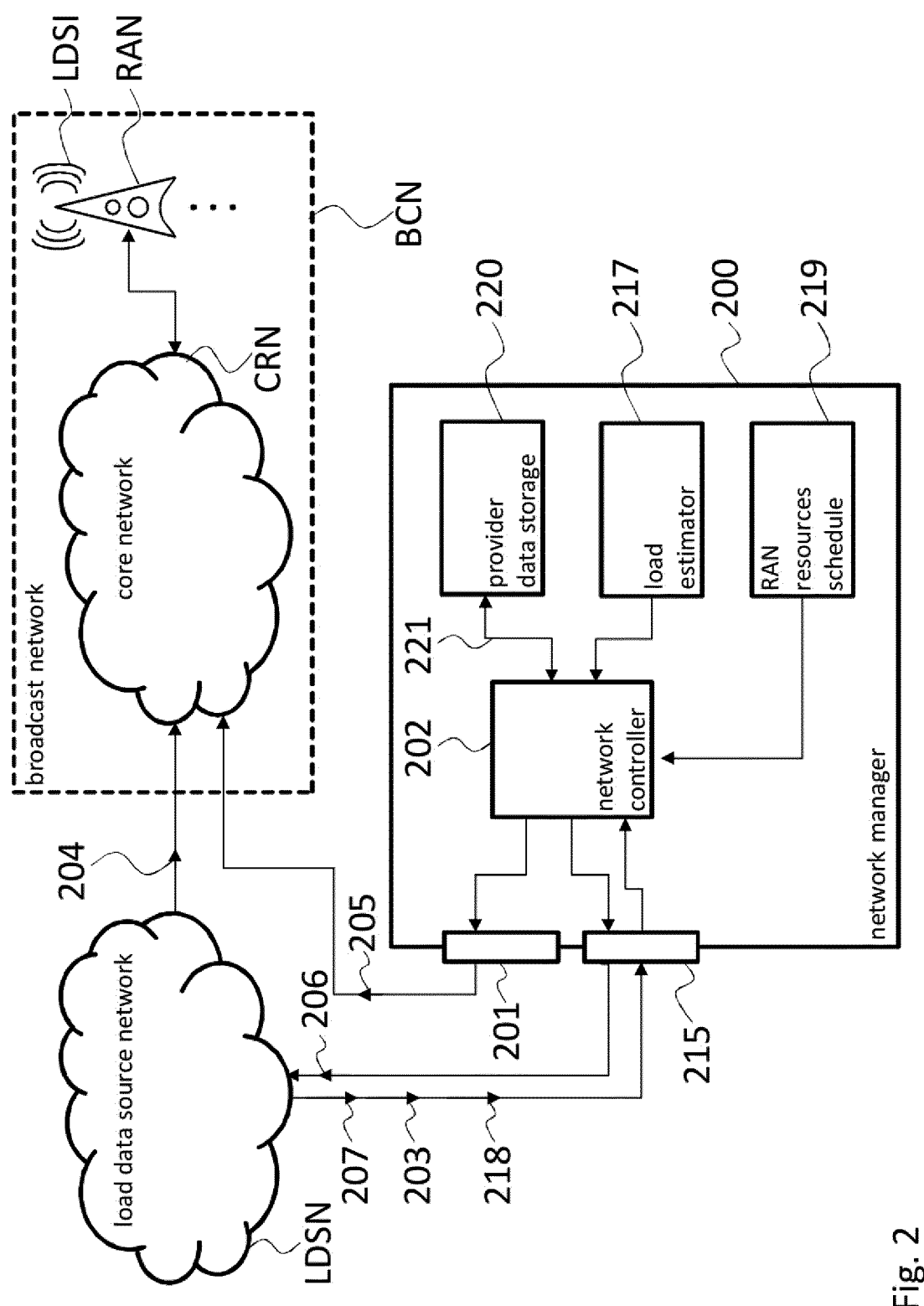
FIG. 2 shows a schematic diagram of another embodiment of a network manager according to the present disclosure, a load data source network and a broadcast network.

FIG. 2 shows another a network manager 200 with a load data source network LDSN and a broadcast network BCN. The above explanations regarding the load data source network LDSN and the broadcast network BCN apply mutatis mutandis.

The network manager 200 is based on the network manager 100, and therefore comprises a data interface 201 that is internally communicatively coupled to a network controller 202. Externally, the data interface 201 is communicatively coupled to the broadcast network BCN and the core network CRN. The above-presented explanations regarding the network manager 100 also apply to the network manager 200 mutatis mutandis.

The network manager 200 further comprises a control interface 215 that is internally communicatively coupled to the network controller 202, and that is externally accessible via any data network, for example the internet. The control interface 215 is communicatively coupled to the load data source network LDSN. Further, the control interface 215 may for example comprise a web-based user-accessible interface, an API-based machine-accessible interface, a RESTful interface, an XML-based or JSON-based interface, and a client-program-based interface. It is understood, that the control interface 215 may also be provided as element of the data interface 201. The control interface 215 may serve as easily accessible interface for exchanging data between the network manager 200, and the provider of the request data 203.

The network manager 200 further comprises a radio access network resources schedule 219 of the broadcast network BCN comprising information about reservations of radio access network resources for the broadcast network BCN. The network controller 202 may therefore provide the configuration proposal data 206 based on the radio access network resources schedule 219.

In addition, the network manager 200 comprises a provider data storage 220 configured to store provider data sets 221 for providers of the load data 204. The provider data sets 221 comprise at least one of allowed radio access network resources and limits for radio access network resources for the respective provider. The network controller 202 may generate the configuration proposal data 206 based on the stored provider data sets 221.

The network manager 200 further comprises a load estimator 217 that estimates a transmission load in the broadcast network BCN for the transmission of the load data 204 based on the request data 203. The network controller 202 may then provide the configuration proposal data 206 further based on the estimated transmission load. The network controller 202 may also define the configuration proposal data 206 based on a combination of the stored provider data set 221 for the respective provider and the estimated transmission load.

Further, in the provider data set 221 an automatic reservation threshold may be stored. The network controller 202 may provide the configuration data 205 to the at least one radio access network RAN based on the configuration proposal data 206 prior to receiving the confirmation data 207, if the automatic reservation threshold is higher than the estimated load value.

Figure 3:
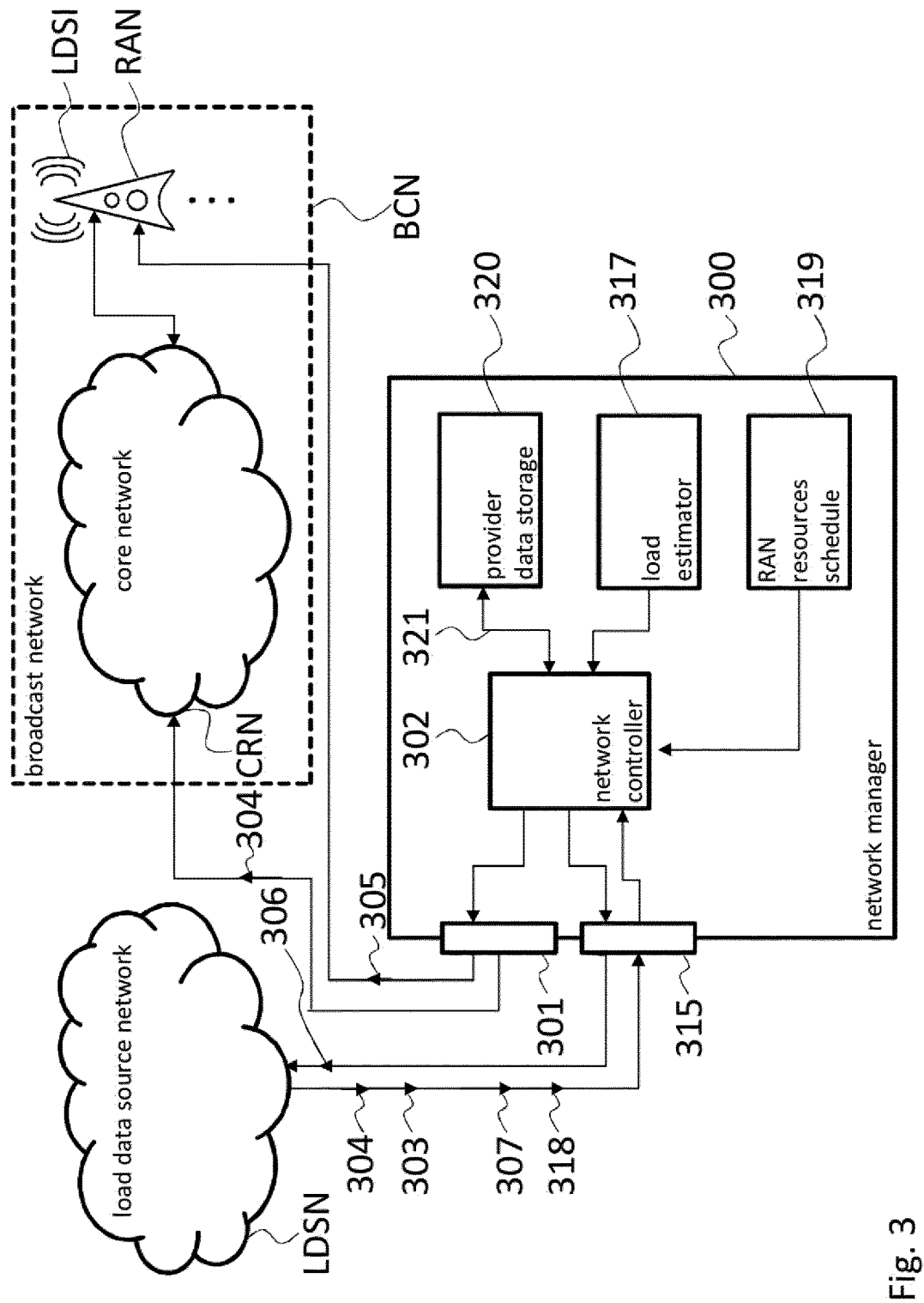
FIG. 3 shows a schematic diagram of another embodiment of a network manager according to the present disclosure, a load data source network and a broadcast network.

FIG. 3 shows another network manager 300. The network manager 300 is based on the network manager 200, and therefore comprises a data interface 301 that is internally communicatively coupled to a network controller 302. Externally, the data interface 301 is communicatively coupled to the broadcast network BCN and the core network CRN.

The network manager 300 also comprises a control interface 315 that is internally communicatively coupled to the network controller 302, a radio access network resources schedule 319 of the broadcast network BCN, a provider data storage 320, and a load estimator 317.

The above-presented explanations regarding network manager 200 and its elements apply mutatis mutandis to network manager 300 and its elements.

In contrast to the arrangement of FIG. 2, in FIG. 3 the network manager 300 receives the load data 304 and forwards the load data 304 to the core network CRN. It is understood, that the network manager 300 may also provide the load data 304 to the radio access networks RAN, instead. Further, network load information 318 may also be provided from other sources e.g., from external databases, to the load estimator 317 directly via the control interface 315.

For sake of clarity in the following description of the method-based FIG. 4 the reference signs used above in the description of apparatus based FIGS. 1-3 will be maintained.

FIG. 4 shows a flow diagram of a method for managing a broadcast network BCN.

The method comprises receiving request data 103, 203, 303 with regard to a transmission of load data 104, 204, 304 from a load data source network LDSN, providing configuration proposal data 106, 206, 306 defining at least one set of radio access network resources for transmission of the load data 104, 204, 304 based on the request data 103, 203, 303 as response to the received request data 103, 203, 303, receiving confirmation data 107, 207, 307 as response to the configuration proposal data 106, 206, 306, the confirmation data 107, 207, 307 referring to one set comprised in the configuration proposal data 106, 206, 306, and providing configuration data 105, 205, 305 based on the confirmation data 107, 207, 307 to at least one radio access network RAN for the purpose of configuring the at least one radio access network RAN to use specific radio access network resources for transmission of the load data 104, 204, 304.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

LIST OF REFERENCE SIGNS 100, 200, 300 network manager
101, 201, 301 data interface
102, 202, 302 network controller
103, 203, 303 request data
104, 204, 304 load data
105, 205, 305 configuration data
106, 206, 306 configuration proposal data
107, 207, 307 confirmation data
215, 315 control interface
217, 317 load estimator
218, 318 network load information
219, 319 radio access network resources schedule
220, 320 provide data storage 221, 321 provider data set
RAN radio access network
LSDI load data signal
BCN broadcast network
CRN core network
LSDN load data source network
S1, S2, S3, S4 method step

The invention claimed is:

1. A network manager comprising:
a data interface configured to communicatively couple to at least one radio access network (RAN) of a broadcast network (BCN) that is configured to wirelessly emit a load data signal, and to communicatively couple to a load data source network (LSDN); and
a network controller communicatively coupled to the data interface and configured to receive request data with regard to a transmission of load data from the LDSN, to provide configuration proposal data defining at least one set of radio access network resources for transmission of the load data based on the request data, and to output the configuration proposal data as in response to the request data;
wherein the data interface is configured to receive confirmation data in response to the configuration proposal data, the confirmation data referring to one set comprised in the configuration proposal data; and
wherein the network controller is configured to provide configuration data based on the confirmation data to the at least one RAN, for the purpose of configuring the at least one RAN to use specific radio access network resources for transmission of the load data.

2. The network manager according to claim 1, wherein the at least one radio access network resource comprises at least one of:
a geographical location for transmission of the load data,
a frequency range or bandwidth for transmission of the load data,
a transmission time or time slot for transmission of the load data, or
a modulation scheme for transmission of the load data; and wherein the request data comprises at least one of:
a priority of the load data,
a quality for transmission of the load data,
a data rate or bandwidth for transmission of the load data,
a transmission time or time slot for transmission of the load data,
a geographical location for transmission of the load data,
encryption information for the load data,
types of intended receiving devices for the LDSI,
a frequency range for transmission of the load data, or
wireless radio access network resources for transmission of the load data.

3. The network manager according to claim 1, wherein the network controller is configured to provide the configuration proposal data based on a radio access network resources schedule of the BCN, the radio access network resources schedule comprising information about reservations of radio access network resources for the BCN.

4. The network manager according to claim 1, comprising a provider data storage configured to store a provider data set for at least one provider of the load data, the provider data set comprising at least one of allowed radio access network resources or limits for radio access network resources for the respective provider;
wherein the network controller is configured to generate the configuration proposal data based on the stored provider data set.

5. The network manager according to claim 1, further comprising:
a load estimator configured to estimate a transmission load in the BCN for the transmission of the load data based on the request data;
wherein the network controller is communicatively coupled to the load estimator and is configured to provide the configuration proposal data further based on the estimated transmission load.

6. The network manager according to claim 4, wherein the network controller is configured to define the configuration proposal data based on the stored provider data set for the respective provider and the estimated transmission load.

7. The network manager according to claim 5, wherein in the provider data set an automatic reservation threshold is stored, and wherein the network controller is configured to provide the configuration data to the at least one RAN based on the configuration proposal data prior to receiving the confirmation data, if the automatic reservation threshold is higher than the estimated load value.

8. The network manager according to claim 1, comprising a control interface communicatively coupled to the network controller and comprising an interface accessible via a data network, wherein the interface comprises at least one of a web-based user-accessible interface, an API-based machine-accessible interface, a RESTful interface, an XML-based or JSON-based interface, or a client-program-based interface.

9. A method for managing a broadcast network, (BCN) the method comprising:
receiving request data with regard to a transmission of load data from a load data source network (LSDN);
providing configuration proposal data defining at least one set of radio access network resources for transmission of the load data based on the request data as in response to the received request data;
receiving confirmation data in response to the configuration proposal data, the confirmation data referring to one set comprised in the configuration proposal data; and
providing configuration data based on the confirmation data to at least one RAN for the purpose of configuring the at least one RAN to use specific radio access network resources for transmission of the load data.

10. The method according to claim 9, wherein the at least one radio access network resource comprises at least one of:
a geographical location for transmission of the load data,
a frequency range or bandwidth for transmission of the load data,
a transmission time or time slot for transmission of the load data, or
a modulation scheme for transmission of the load data; and wherein the request data comprises at least one of:
a priority of the load data,
a quality for transmission of the load data,
a data rate or bandwidth for transmission of the load data,
a transmission time or time slot for transmission of the load data,
a geographical location for transmission of the load data,
encryption information for the load data,
types of intended receiving devices for load data signals (LSDI),
a frequency range for transmission of the load data, or
wireless radio access network resources for transmission of the load data.

11. The method according to claim 9, wherein the configuration proposal data is provided further based on a radio access network resources schedule of the BCN, the radio access network resources schedule comprising information about reservations of radio access network resources for the BCN.

12. The method according to claim 9, further comprising storing a provider data set for at least one provider of the load data, the provider data set comprising at least one of allowed radio access network resources or limits for radio access network resources for the respective provider; wherein the configuration proposal data is provided based on the stored provider data set.

13. The method according to claim 9, further comprising estimating a transmission load in the BCN for the transmission of the load data based on the request data;

wherein the configuration proposal data is further provided based on the estimated transmission load.

14. The method according to claim 12, wherein the configuration proposal data is further defined based on the stored provider data set for the respective provider and the estimated transmission load.

15. The method according to claim 13, wherein in the provider data set an automatic reservation threshold is stored, and wherein the configuration data is provided to the at least one RAN further based on the configuration proposal data prior to receiving the confirmation data, if the automatic reservation threshold is higher than the estimated load value.

16. The method of claim 9, further comprising:

receiving the request data via an interface accessible via a data network, wherein the interface comprises at least one of a web-based user-accessible interface, an API-based machine-accessible interface, a RESTful interface, an XML-based or JSON-based interface, or a client-program-based interface.

\* \* \* \* \*